Jan. 8, 1929.
S. A. CRONE
1,698,393
RAILWAY BRAKE BEAM SUPPORT
Filed May 18, 1926   2 Sheets-Sheet 1
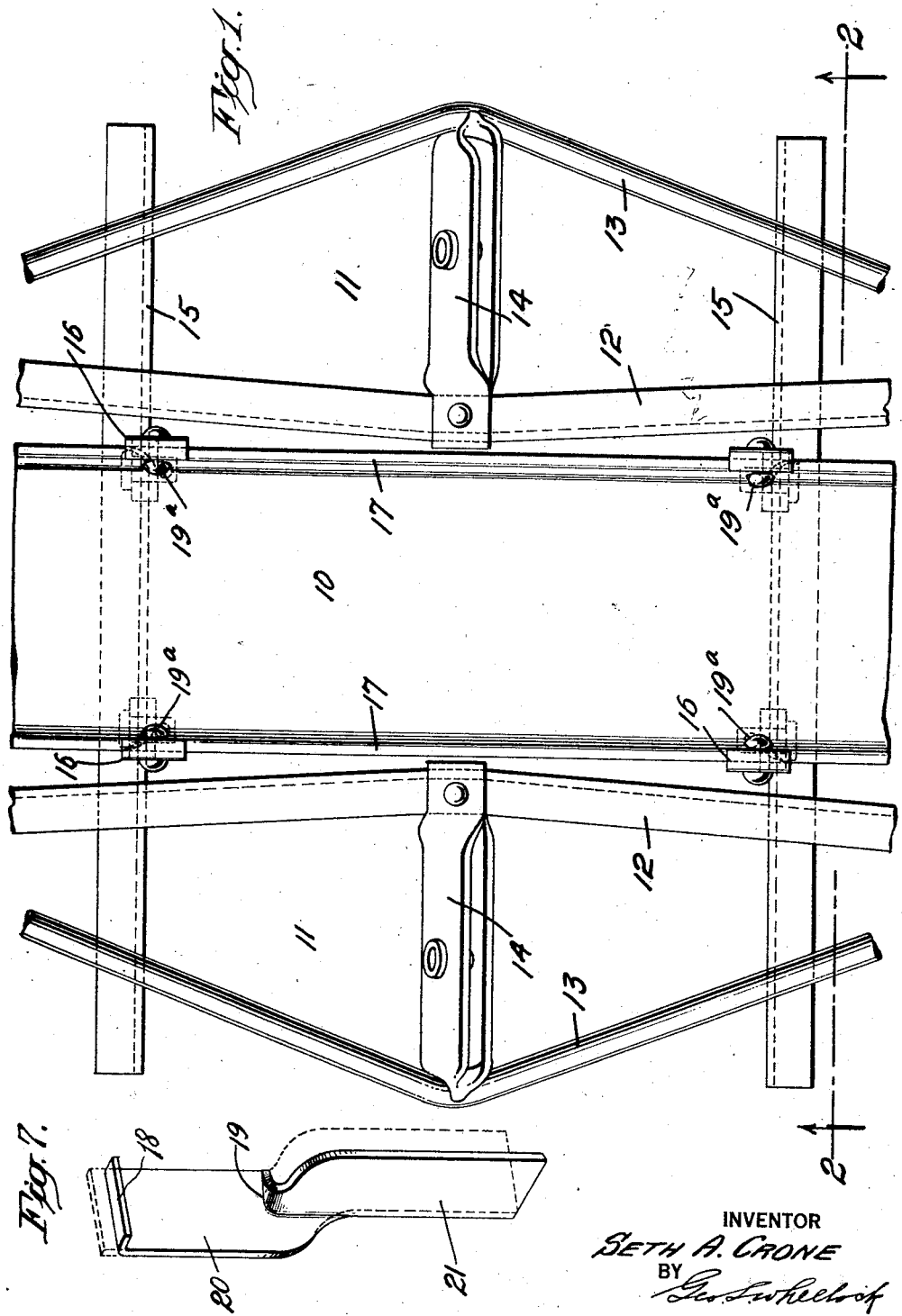
INVENTOR
SETH A. CRONE
BY
Geo. S. Wheelock
ATTORNEY

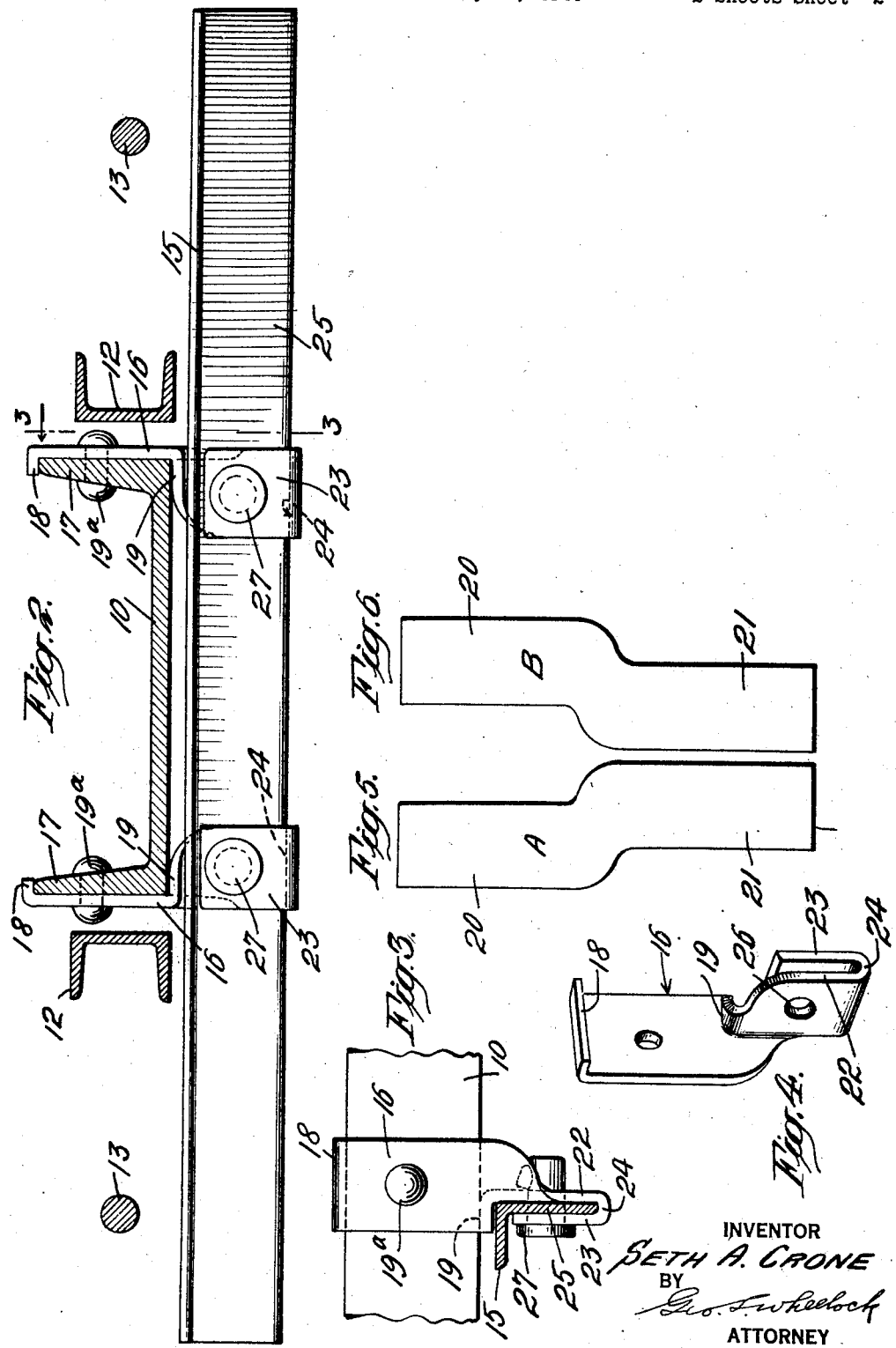

Patented Jan. 8, 1929.

1,698,393

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

RAILWAY-BRAKE-BEAM SUPPORT.

Application filed May 18, 1926. Serial No. 110,013.

This invention relates to improvements in railway brake beam supports and a method of forming certain portions thereof, and has particular reference to emergency safety supporting bars and their connections to the spring plank or other part of a railway car truck.

Railway car trucks are usually provided with safety supporting bars which extend below the brake beam mechanism in such a manner as to prevent the latter from falling under the wheels in case it should become accidentally loosened from its hangings. Such supporting bars have comprised various structural steel shapes secured to the spring plank of the truck by suitable brackets. In some car trucks the attachment of the supporting bars to the spring plank has been difficult due to limitations in available space, and this has been particularly true in those structures where the brake beam is positioned close to the side flange of the spring plank, and where the emergency supporting bars must be held close up to the bottom of the spring plank.

An important object of this invention is to provide an emergency safety supporting bar and mounting bracket therefor which may be firmly secured on a car truck and which will require a minimum amount of space for its attachment.

Another object is to provide such a device wherein the supporting bar will be held with great security yet readily removable for purposes of repair or replacement.

Another object is to provide such a mechanism with a safety bar supporting bracket which may readily and economically be produced from a single blank of sheet metal and which will be strong and durable in service, and an improvement in the art.

Another object is to provide a novel method of producing a supporting bracket of the character referred to.

Other objects and advantages will be apparent from the following description in connection with the accompanying drawings, wherein the invention is disclosed by way of illustration.

In the drawings. Figure 1 is a fragmentary, top plan view of a brake beam mechanism for railway car trucks provided with emergency safety bars and supports thereof, embodying the invention.

Figure 2 is a vertical, transverse sectional view, on the line 2—2 of Figure 1;

Figure 3 is a view taken on the line 3—3 of Figure 2, and showing one of the emergency safety bars in cross-section and its supporting bracket in side elevation;

Figure 4 is a detail, perspective view of one of the safety bar supporting brackets per se;

Figure 5 is a detail, plan view of the sheet metal blank from which one of the supporting brackets may be formed;

Figure 6 is a view similar to Figure 5, of the blank for the formation of a bracket of the opposite hand from that of Figure 5;

Figure 7 is a perspective view of a partly finished supporting bracket formed from a blank, as shown in Figure 5.

The invention may be applied to any desired type of railway car truck having a spring plank 10 at the opposite sides of which are the usual brake beam mechanisms 11. As best shown in Figure 1, each brake beam mechanism comprises a brake beam 12 and a compression member 13 which are connected together by the usual strut 14 in which the brake operating devices may be suitably mounted. Extending in a direction transverse to that of the spring plank are a pair of emergency safety supporting bars 15 which are positioned below the spring plank 10 and extend beyond the limits of the brake beam mechanisms in such a manner as to be capable of preventing them from falling under the wheels in case of accidental loosening. The safety bars 15 are firmly held in position by bracket members 16 which are disposed at opposite sides of the spring plank 10 and suitably secured thereto. The brackets 16 are all alike in structure and therefore a detailed description of only one will be given.

Referring now particularly to Figures 2 to 6 inclusive, it will be seen that the bracket 16 has an upper portion lying against the outer surface of the side flange 17 of the spring plank 10 and has its upper extremity flanged as at 18 to overlie the upper edge of the spring plank. The lower portion of the bracket extends inwardly below the spring plank 10 and is preferably formed with a seat portion 19 for engaging the lower surface of the spring plank, whereby to firmly position the same for securement by a rivet 19ª or other suitable fastening means. The supporting bracket may preferably be formed from a strip of sheet metal blanked out, as shown in Figures 5 and 6, and in which a pair of offset portions 20 and 21 are provided for the formation of the finished bracket. The lower end of the portion 21 extends upwardly, as at 23, to form a supporting seat 24 for the lower edge of a vertical flange 25 of the safety bar, said vertical flange 25 being engaged on its opposite sides by the members 22 and 23. Any suitable means may be employed for securing the safety bar 15 and, for this purpose, as shown in the drawings, the members 22 and 23 may have aligned openings 26 for the reception of a removable locking pin 27.

The bracket 16 will preferably be made in rights and lefts, as shown in Figures 5 and 6, wherein A designates the blank for one of such members and B designates a blank for a bracket of the opposite hand. In carrying out the improved method of manufacture, a blank such as A in Figure 5 is cut, punched, or otherwise formed from suitable stock such as wrought iron or heavy sheet steel. The lower offset portion 21 is then twisted to the position shown in Figure 9, this operation being facilitated by heating of the central portion of the blank, where the two offset portions merge, after which the opposite ends are firmly gripped by oppositely rotatable jaws, well known to those skilled in the art. This twisting operation may also be assisted by the use of forming dies engageable with the opposite sides of the central portion of the blank, whereby to insure uniform accuracy in the production of the seat portion 19. The upper extremity of the portion 20 may then be bent over to form the flange 18, extending inwardly from the portion 20 in the same direction as the twisted portion, and thereafter the lower portion may be reversely bent to form the supporting seat 24 and flat engaging portion 23. The apertures 26, as well as that for the passage of the rivet 19ª are then drilled, completing the bracket.

As has already been pointed out, the lower portion 21 of the blank from which the bracket 16 is formed is twisted inwardly to be positioned close up to the bottom of the spring plank 10, and in this manner the safety bars will be firmly held in place and occupying a minimum amount of space in the car truck.

In the drawings, the safety bars 15 have been shown as being of angle-bar formation, and while the supporting brackets 16 are especially adaptable for such a bar, they can of course be used for other structural steel shapes, if desired. In the event that it is necessary to make repairs or replacements, the safety bars 15 may be easily detached by first removing the locking pin 27 and thereafter withdrawing the safety bars in a longitudinal direction from the bracket 16.

From the foregoing it will be evident that an especially simple construction has been provided for safety bar supports and one which may be economically manufactured from sheet material. In view of the fact that the safety bar is held up close to the bottom of the spring plank and furthermore because the supporting brackets do not extend any substantial distance beyond the sides of the spring plank, the invention is desirable for car trucks wherein space is limited for the application of such devices. Obviously, the invention is susceptible of further modification in the details of construction, arrangement of parts, and steps in the method of manufacture, and the right is herein reserved to make such changes as fall within the scope of the appended claims without departing from the spirit of the invention.

Having thus described my invention, what I claim is:

1. A supporting bracket for safety bars and the like, comprising a metallic member adapted to be secured to the side of a spring plank of a car truck, the lower portion of said member being twisted through an angle of substantially ninety degrees to present a flat surface to a safety bar, said lower portion substantially extending in its entirety inwardly below the spring plank, and having a supporting seat for said safety bar.

2. The method of producing a supporting bracket for brake beam safety bars, consisting in providing a flat metal blank with a pair of offset portions, twisting one of said portions relatively to the other portion whereby to dispose them in planes at substantially right angles to each other, and reversely bending part of the lowermost portion to form a supporting seat for a safety bar.

3. The method of producing a supporting bracket for brake beam safety bars, consisting in providing a flat metal blank with upper and lower offset portions disposed in a single plane, twisting the blank to dispose said offset portions in relatively perpendicular planes, reversely bending the lower offset portion to form a supporting seat for a safety bar, and forming an inwardly extending flange on the upper edge of the blank.

4. The method of producing a supporting bracket for brake beam safety bars, consisting in providing a flat metal blank with upper and lower offset portions disposed in a single plane, heating the blank, twisting that portion of the blank where the two offset portions merge, whereby the lower offset portion will lie in a plane perpendicular to that of the upper portion and extending inwardly therefrom, and thereafter flanging the upper extremity of the blank, and reversely bending the lower extremity to form a supporting seat for a safety bar.

5. A supporting bracket for safety bars, comprising a sheet metal member for securement to the spring plank of a car truck, the lower portion of the member extending downwardly and then upwardly and being bent entirely to one side of the plane of the upper portion in the form of an upright seat for a safety bar, the downward portion bisecting the plane of the upper portion.

SETH A. CRONE.